United States Patent [19]
Nakajima et al.

[11] Patent Number: 5,576,825
[45] Date of Patent: Nov. 19, 1996

[54] PATTERN DETECTING APPARATUS

[75] Inventors: Tohru Nakajima; Mituhiro Nagase, both of Tokyo, Japan

[73] Assignee: Laurel Bank Machines Co., Ltd., Tokyo, Japan

[21] Appl. No.: 459,987

[22] Filed: Jun. 2, 1995

Related U.S. Application Data

[63] Continuation of Ser. No. 151,033, Nov. 12, 1993, abandoned.

[30] Foreign Application Priority Data

Nov. 13, 1992 [JP] Japan .................................. 4-304181
Nov. 5, 1993 [JP] Japan .................................. 5-276645

[51] Int. Cl.⁶ ........................................... G06K 9/20
[52] U.S. Cl. ............................................... 356/71
[58] Field of Search ................................ 356/71; 382/7; 385/120

[56] References Cited

U.S. PATENT DOCUMENTS

| | | | |
|---|---|---|---|
| 3,922,090 | 11/1975 | Fain .................................... | 356/71 |
| 4,245,507 | 1/1981 | Samulski ............................ | 356/44 |
| 4,611,345 | 9/1986 | Ohnishi et al. ..................... | 356/71 |
| 4,678,338 | 7/1987 | Kitta et al. ......................... | 356/420 |
| 4,881,268 | 11/1989 | Uchida et al. ..................... | 356/71 |
| 5,027,415 | 6/1991 | Hara et al. .......................... | 382/7 |
| 5,077,821 | 12/1991 | Makel et al. ....................... | 385/120 |

FOREIGN PATENT DOCUMENTS

| | | |
|---|---|---|
| 0101115 | 2/1984 | European Pat. Off. . |
| 0240277 | 10/1987 | European Pat. Off. . |
| 530922 | 3/1993 | European Pat. Off. . |
| 2039440 | 2/1972 | Germany . |
| 210770 | 12/1982 | Japan ................................ 385/120 |
| 59-112385 | 6/1984 | Japan . |
| 1384501 | 2/1975 | United Kingdom . |
| 2035549 | 6/1980 | United Kingdom . |
| 2107911 | 5/1983 | United Kingdom . |
| 2192275 | 1/1988 | United Kingdom . |
| 2228817 | 9/1990 | United Kingdom . |
| 94/12867 | 6/1994 | WIPO . |

OTHER PUBLICATIONS

R. J. Potter, "Multichannel Flying Spot Scanner", Technical Disclosure Bulletin, vol. 6, No. 6, Nov. 1963.
Patent Abstract of Japan, vol. 12 No. 366 (P–765) Sep. 1988 re JP-A-61-260589.

*Primary Examiner*—Richard A. Rosenberger
*Attorney, Agent, or Firm*—Cushman Darby & Cushman

[57] ABSTRACT

A pattern detecting apparatus having an irradiating means for emitting light and irradiating a surface of an object whose pattern is to be detected, and a light detecting means for detecting light reflected from the surface of or transmitted through the object, wherein a pattern on the surface of the object is detected based on information from the light detecting means is disclosed. The pattern detecting apparatus further comprises a light transmitting means for transmitting light advancing in a predetermined direction. The light transmitting means is positioned between the object and the light detecting means such that the predetermined direction coincides with the direction in which the reflected or transmitted light from the object advances.

13 Claims, 4 Drawing Sheets

PATTERN DETECTING APPARATUS

This is a continuation-in-part (CIP) of application Ser. No. 08/151,033, filed on Nov. 12, 1993, which was abandoned upon the filing hereof.

FIELD OF THE INVENTION

The present invention relates to a pattern detecting apparatus for accurately detecting patterns, and more particularly, to such an apparatus for accurately detecting patterns formed on an object such as a bill or bank note (hereinafter referred to collectively as "bill"), coin or the like.

DESCRIPTION OF PRIOR ART

The conventional pattern detecting apparatus comprising a light source, a lens, and an image sensor is well known. In the prior art pattern detecting apparatus, the light source emits light onto the object whose pattern is to be detected, such as a bill or coin, and the lens focuses the image carried by light reflected from or transmitted through the object on the image sensor for reading the image as a pattern, whereby the genuineness, kind and the like of the object are discriminated by comparing the pattern with a reference pattern stored in the apparatus in advance.

Recently, the developed printing and surface forming techniques have made it possible to form fine patterns on the surface of objects. Consequently, a pattern detecting apparatus is required to be able to accurately detect such fine patterns. For example, if a resolution of 500 dpi (dots per inch) is required in order to detect a fine pattern, the pattern detecting apparatus has to be able to detect discrete pattern micro areas measuring as small as 50 μm * 50 μm.

However, the individual an pixels of image sensor may receive not only information related to the corresponding micro area of the pattern but also, owing to stray light irregularly reflected from or transmitted through the object information related to adjacent areas. In this case, since the information received by each of the pixels is low in accuracy and, therefore, the signal-to-noise ratio of the whole pattern is inevitably low, fine patterns on the object cannot accurately be detected.

SUMMARY OF THE INVENTION

It is therefore an object of the invention to provide a pattern detecting apparatus for accurately detecting fine patterns on an object such as a bill, coin or the like.

The above and other objects of the invention are accomplished by a pattern detecting apparatus having an irradiating means for emitting light and irradiating the surface of an object whose pattern is to be detected and a light detecting means for detecting light reflected from the surface of or transmitted through the object, and wherein a pattern on the surface of the object is detected based on information from the light detecting means, the pattern detecting apparatus further comprising a light transmitting means for transmitting light advancing in a predetermined direction, the light transmitting means being positioned between the object and the light detecting means such that the predetermined direction coincides with the direction in which the reflected or transmitted light from the object advances.

In a preferred aspect of the invention, the irradiating means is adapted to irradiate the surface of the object with at least two kinds of light of different wavelengths, and the light detecting means is adapted to detect the reflected or transmitted light of each wavelength by use of a time sharing method.

In another preferred aspect of the invention, the irradiating means comprises a light source for emitting light, an optical means for converging the light emitted from the light source, and a light guide means for guiding the light converged by the optical means onto the object.

In a further preferred aspect of the invention, the light guide means includes an optical fiber bundle having a plurality of optical fibers.

In a still further preferred aspect of the invention, the light guide means is adapted to direct the light obliquely onto the object.

In another preferred aspect of the invention, the irradiating means is adapted to emit two kinds of light of different wavelengths and said light detecting means includes a first detecting means and a second detecting means, the pattern detecting apparatus further comprising a reflecting/transmitting means for reflecting light of a predetermined wavelength and for transmitting light of other wavelengths, the reflecting/transmitting means being positioned such that the first detecting means receives the reflected or transmitted light of the predetermined wavelength and that the second detecting means receives the reflected or transmitted light of other wavelengths.

In an alternative aspect of the invention, there is provided a pattern detecting apparatus having an irradiating means for emitting light and irradiating the surface of an object whose pattern is to be detected, a light detecting means for detecting reflected light from the surface of the object, and wherein a pattern on the surface of the object is detected based on information from the light detecting means, the pattern detecting apparatus further comprising a light transmitting means for transmitting light advancing in a predetermined direction, the light transmitting means being positioned between the object and said light detecting means such that the predetermined direction coincides with the direction in which the reflected light from the object advances, and a transmitting/reflecting means for transmitting the light emitted from the irradiating means and for reflecting the light reflected from the object in a predetermined direction, said light transmitting means and the transmitting/reflecting means being arranged such that the light emitted from the irradiating means reaches said object via said transmitting/reflecting means and the light transmitting means and that the light reflected from the object is received by the light detecting means via the light transmitting means and the transmitting/reflecting means.

In a preferred aspect of the present invention, the transmitting/reflecting means includes a beam splitter.

In another preferred aspect of the invention, the irradiating means is adapted to emit two kinds of light of different wavelengths and the light detecting means includes a first detecting means and a second detecting means, the pattern detecting apparatus further comprising reflecting/transmitting means for reflecting light of a predetermined wavelength and for transmitting light of other wavelengths, the reflecting/transmitting means being positioned such that the first detecting means receives the reflected light of the predetermined wavelength and that the second detecting means receives the reflected light of other wavelengths.

In a further preferred aspect of the invention, the reflecting/transmitting means includes a dichroic mirror.

In a still further preferred aspect of the invention, the light transmitting means includes a plurality of optical fibers arranged in the form of plate.

In another preferred aspect of the invention, the light detecting means includes a plurality of pixels arranged in a line lying perpendicular to the direction in which the object is to be fed.

In a further preferred aspect of the invention, the detecting means includes a plurality of pixels arranged in a plurality of lines lying perpendicular to the direction in which the object is to be fed.

In a still further preferred aspect of the invention, the light detecting means comprises CCD (charge-coupled device).

The above and other objects and features of the present invention will become apparent from the following description made with the reference to the accompanying drawings.

DESCRIPTION OF THE PREFERRED EMBODIMENTS

Figure 1:
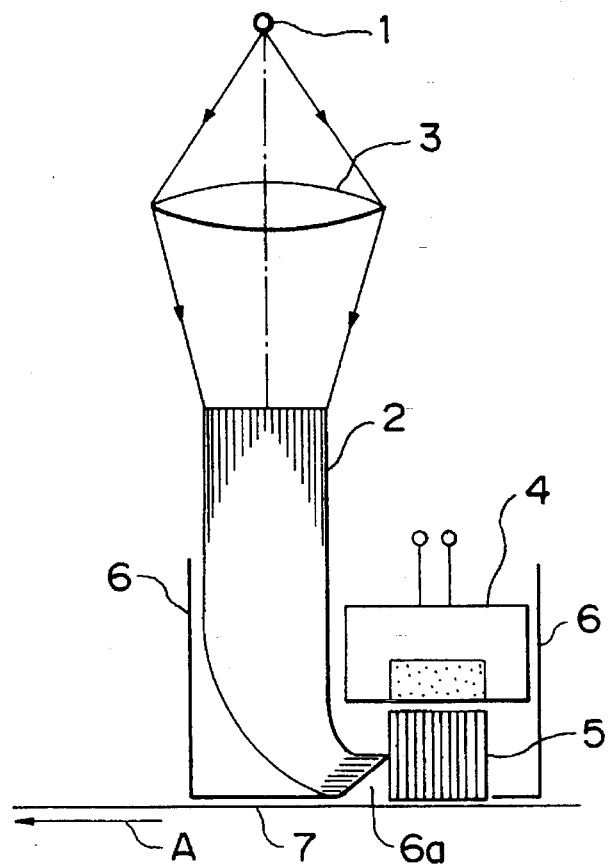
FIG. 1 is a schematic front view of a printed pattern detecting apparatus which is an embodiment of the present invention.

Referring to FIG. 1, a printed pattern detecting apparatus which is an embodiment of the present invention comprises a light source 1 for emitting light toward the surface of a bill 7 on which the pattern to be detected is printed, a lens 3 for converging the light emitted from the light source 1 onto the end face of an optical fiber bundle 2 comprising a number of optical fibers and serving to guide the light converged onto the end face thereof by the lens 3 onto the surface of the bill 7, a fiber plate 5 having a number of optical fibers arranged in the form of a matrix for directing the light reflected from the surface of the bill 7 to a sensor 4, the sensor 4 having a number of pixels for receiving the reflected light guided by the fiber plate 5, and a light shielding plate 6 for ensuring that the surface of the bill is irradiated only by light from the optical fiber bundle 2.

As shown in FIG. 1, the bill 7, whose surface is printed with a pattern to be detected, is conveyed by a conveying device (not shown) in the direction indicated by arrow A so as to feed the same to the printed pattern detecting apparatus.

In the printed pattern detecting apparatus, the light emitted from the light source 1 is converged onto the end face of the optical fiber bundle 2. The optical fiber bundle 2 includes a sufficient number of optical fibers for uniformly irradiating the surface of the bill 7 with the light converged onto the end face of the light bundle 2. The end face of the optical fiber bundle 2 facing the lens 3 is shaped cylindrically or rectangularly so as to be able to efficiently receive the light emitted from the light source 1 thereon. The light from the optical fiber bundle 2 is directed obliquely onto the surface of the bill 7.

The sensor 4 which is constituted as a CCD (charge-coupled device) has a number of pixels arranged in the scanning direction, and the end face of the optical fiber bundle 2 facing the sensor 4 is shaped rectangularly to have a width equal to that of the sensor 4 in the scanning direction. Consequently, the light from the light source 1 is uniformly emitted onto the surface of the bill 7 over the width thereof to be scanned, via the lens 3 and the optical fiber bundle 2.

The shielding plate 6 is formed with an opening 6a of a sufficient size to allow the end face of the optical fiber bundle 2 and that of the fiber plate 5 to face each other, and to minimize incident light from sources other than the optical fiber bundle 2.

Figure 3:
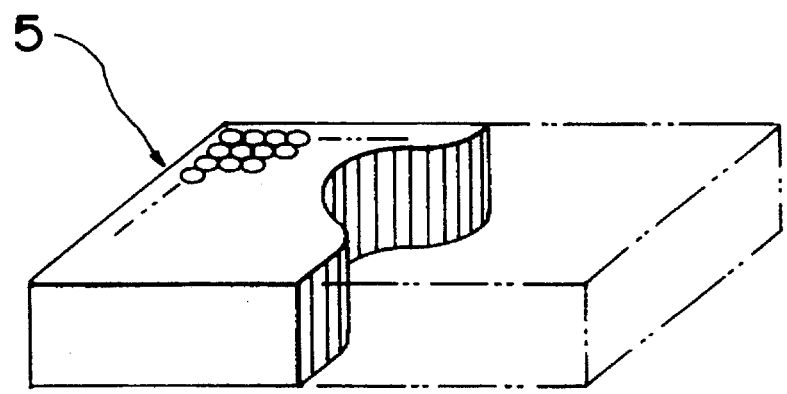
FIG. 3 is a schematic perspective view of a fiber plate used in the printed pattern detecting apparatus shown in FIG. 1.
Figure 4:
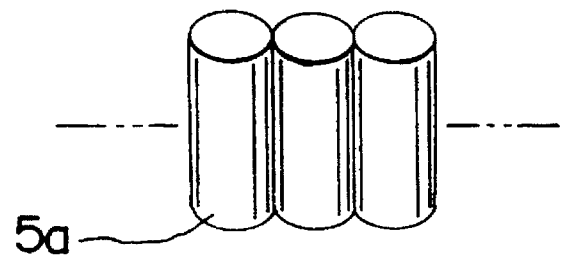
FIG. 4 is a schematic perspective view of a few of the optical fibers comprising the fiber plate shown in FIG. 3.

FIG. 3 is a schematic perspective view of the fiber plate 5, and FIG. 4 is a schematic perspective view of a few of the optical fibers 5a constituting the fiber plate 5.

Figure 2:
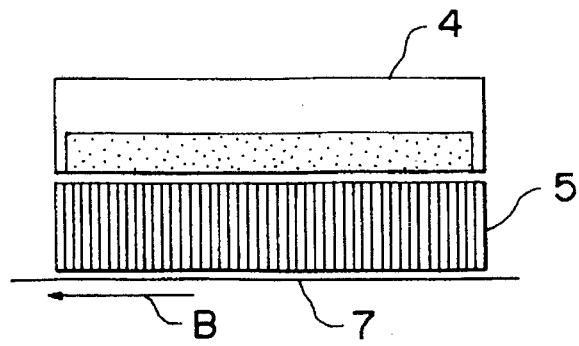
FIG. 2 is a schematic side view of the printed pattern detecting apparatus shown in FIG. 1.

As shown in FIG. 3, the fiber plate 5 is formed to be plate-like by arranging a number of optical fibers 5a in a matrix. Each of the optical fibers 5a has a very small diameter and a predetermined length and has its axis oriented vertically. As shown in FIG. 4, in this embodiment, the optical fibers 5a are cylindrical. Each has a diameter of 50 µm and is adapted for receiving light on one end face thereof at an angle within ±10 degrees with respect to the light axis thereof and emitting the received light from the other end face thereof. As shown in FIGS. 1 and 2, the optical fibers 5a of the fiber plate 5 are arranged in a matrix to match the image formation surface of the sensor 4.

The fiber plate 5 is positioned to be spaced slightly above the upper surface of the bill 7 conveyed by the conveying device (not shown) such that only a particular optical fiber 5a receives the light which is emitted from the light source 1, reaches the surface of the bill 7 via the optical fiber bundle 2 and is reflected from a corresponding micro area of predetermined size on the surface of the bill 7 and that light reflected from other micro areas is prevented from being received thereby. Namely, since each of the micro areas on the surface of the bill 7 corresponds to a particular optical fiber 5a, the reflected light from each of the micro areas can be received by and only by the corresponding optical fiber 5a. This embodiment employs 50 µm cylindrical optical fibers 5a adapted for receiving light on one end face thereof at an angle within ±10 degrees with respect to the light axis thereof. Supposing that the diameter of the optical fiber 5a is "a" and that the wavelength of the irradiated light is "L", the focus depth becomes $a^2/L$ owing to the pinhole effect at the end face of the optical fiber 5a. In this embodiment, since the light source 1 emits light of a wavelength less than 500 nm, the distance between the end face of the optical fiber 5a and the surface of the bill 7 is set at 1.25 mm.

In this manner, by determining the distance between the end face of the optical fiber 5a and the surface of the bill 7, and setting the size of each pixel of the sensor 4 at 50 µm *50 µm as stated below, the size of each of the micro areas on the surface of the bill 7 can be set at substantially 50 µm * 50 µm.

The sensor 4 has a number of pixels at the image formation surface thereof. Each of the pixels is adapted to receive light reflected from a particular micro area on the surface of the bill 7 via the corresponding optical fiber 5a so that the image formation surface of the sensor 4 receives the reflected light from the surface of the bill 7 as an image of the printed pattern. In this embodiment, the image formation surface of the sensor constituted as a CCD is provided with a number of pixels, each measuring 50 μm * 50 μm, so that each of the pixels corresponds to a particular micro area on the surface of the bill 7. The distance between the fiber plate 5 and the image formation surface of the sensor 4 is determined such that each pixel on the image formation surface of the sensor 4 receives only the light emitted from the corresponding optical fiber 5a and does not receive light emitted from any other optical fiber 5a. Accordingly, the light reflected from a particular micro area on the surface of the bill 7 can be received by the corresponding fine 50 μm * 50 μm pixel via the corresponding optical fiber 5a of the fiber plate 5. As a result, the printed pattern of the bill 7 is discretely transferred to the fine 50 μm * 50 μm pixels on the image formation surface of the sensor 4. Consequently, each of the pixels on the image formation surface of the sensor 4 stores only the printed pattern of the corresponding micro area of the bill 7 and does not store the printed pattern of any other micro area.

When the bill 7 is fed to the thus constituted printed pattern detecting apparatus by the conveying device (not shown), the light emitted from the light source 1 reaches the surface of the bill 7 via the lens 3 and the optical fiber bundle 2. The reflected light from each of the micro areas on the surface of the bill 7 is received by the corresponding pixel on the image formation surface of the sensor 4 via a corresponding optical fiber 5a of the fiber plate 5. In this manner, the reflected light from all micro areas on the surface of the bill 7 is received by the pixels of the sensor 4, which is to say that the printed pattern of the bill 7 is transferred onto the image formation surface of the CCD sensor 4. In the well-known manner, the sensor 4 scans the printed pattern transferred onto the image formation surface along the scanning direction B perpendicular to the conveying direction A in response to clock signals received from a control device (not shown) so as to feed the pattern data to a processing device (not shown), whereby they are compared with the data of a reference pattern for discriminating the genuineness, kind and the like of the bill 7.

Since the conveying speed of the bill 7 is predetermined, and the number of pixels along the scanning direction is predetermined in accordance with factors such as the size of the bill 7, the clock frequency for scanning the printed pattern transferred onto the image formation surface is determined with reference to the desired pitch in the conveying direction. For example, supposing that the conveying speed of the bill is 1 m/sec and that the sensor has 4000 pixels arranged in a line along the scanning direction, if printed pattern information at intervals of 0.2 mm is to be obtained along the conveying direction, the clock frequency is set at 20 MHz because the time for scanning the sensor 4 has to be 0.2 msec. Further, if the sensor has its pixels arranged in a plurality of lines along the scanning direction, the clock frequency for scanning the sensor 4 is determined with reference to the desired pitch in the conveying direction and the number of pixel lines lying in the scanning direction.

According to this preferred embodiment, since the reflected light from each of the micro areas on the surface of the bill 7 is received by a corresponding pixel measuring 50 μm * 50 μm on the image formation surface of the sensor 4 via a corresponding optical fiber 5a of the fiber plate 5, whereby the pixel stores only the printed pattern data corresponding to a particular micro area of the bill 7, it is possible to accurately detect the printed pattern of the bill 7 without the influence from stray light.

Furthermore, according to this preferred embodiment, since the light emitted from the light source 1 is obliquely directed onto the surface of the bill 7 by means of the optical fiber bundle 2, the reflected light from the bill 7 carries not only printed pattern information but information relating to characteristics ascertainable from the laterally reflected light, namely, information concerning unevenness of the surface of the bill 7 caused by the ink forming the printed pattern, wrinkles on the surface of the bill 7 and the like. Consequently, it is possible to detect not only the pattern information based upon optical density but also other information indicative of the quality and condition of the bill 7, whereby it is possible to judge the quality of the bill 7, the degree of damage of the bill 7 and the like.

Figure 5:
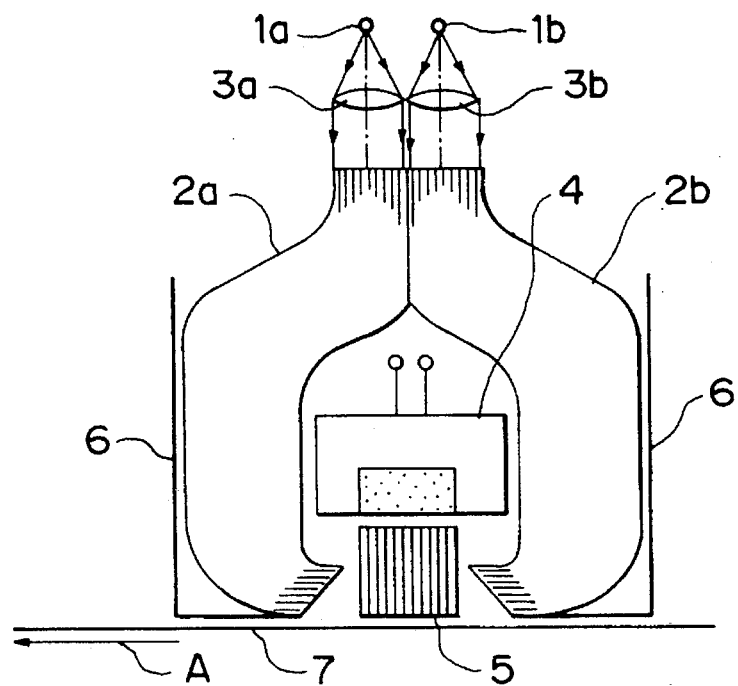
FIG. 5 is a schematic front view of a printed pattern detecting apparatus which is another embodiment of the present invention.

FIG. 5 is a schematic front view of a printed pattern detecting apparatus which is another embodiment of the present invention.

As shown in FIG. 5, the printed pattern detecting apparatus comprises a pair of light sources 1a, 1b, a pair of lenses 3a, 3b, a pair of optical fiber bundles 2a, 2b, a fiber plate 5, a sensor 4, and a shielding plate 6. The light source 1a comprises a green light emitting diode (LED), whereas the other light source 1b comprises a red light emitting diode. These light sources 1a, 1b are controlled by the control device (not shown) so as to emit light alternately. The lenses 3a, 3b and the optical fiber bundles 2a, 2b are formed in substantially the same manner as the lens 3 and the optical fiber bundle 2 of the above described embodiment. Similarly, the fiber plate 5 and the sensor 4 are identical to those employed in the above described embodiment. In this embodiment, the light source 1a, the lens 3a, and the optical fiber bundle 2a constitute a first irradiating unit, and the light source 1b, the lens 3b, and the optical fiber bundle 2b constitute a second irradiating unit. The first and the second irradiating units are symmetrically arranged with respect to the center axis of the fiber plate 5 and the sensor 4.

When the bill 7 is fed to the thus constituted printed pattern detecting apparatus by the conveying device (not shown), the light sources 1a and 1b alternately emit light in accordance with a control signal from the control device (not shown). The light emitted from the light source 1a or 1b reaches the surface of the bill 7 via the lens 3a and the optical fiber bundle 2a or via the lens 3b and the optical fiber bundle 2b. Thus, the reflected light from each of the micro areas on the surface of the bill 7 is received by the corresponding pixel on the image formation surface of the sensor 4 via the corresponding optical fiber 5a of the fiber plate 5. The control device (not shown) feeds clock signals to the sensor 4 in synchronism with the cycle during which the light source 1a or 1b alternately emits light. As a result, the printed pattern transferred onto the image formation surface of the scanner 4 by the light emitted from the light source 1a and reflected from the bill 7 is scanned to form a first printed pattern while the light source 1a is emitting light, whereas the printed pattern transferred onto the same by the light emitted from the other light source 1b and reflected from the bill 7 is scanned to form a second printed pattern while the light source 1b is emitting light. Accordingly, by time shared scanning of the sensor 4, the first printed pattern can be obtained from the light reflected from the bill surface, during the time that the light source 1a comprising the green LED is emitting light of a wavelength substantially corresponding to that of green, whereas the second printed pattern can be obtained from the light reflected from the bill surface, during the time that the light source 1b comprising the red LED is emitting light of a wavelength substantially corresponding to that of red. Consequently, pattern information based on two-color separation can be obtained. Finally, the thus obtained printed pattern data for the entire bill surface produced by the sensor 4 is fed to the processing device (not shown), whereby they are compared with the reference pattern to discriminate the genuineness, kind and the like of the bill 7.

According to this embodiment, since the printed patterns of the bill 7 are analyzed into printed pattern information based upon two-color separation of green and red separation, it is possible to more accurately detect the printed pattern of the bill 7.

Figure 6:
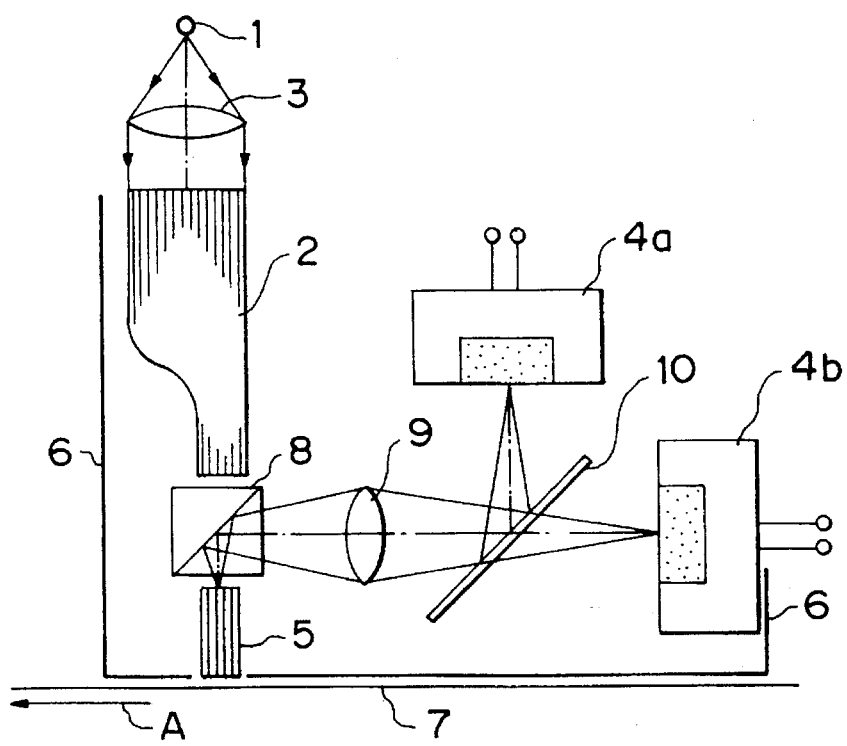
FIG. 6 is a schematic front view of a printed pattern detecting apparatus which is a further embodiment of the present invention.

FIG. 6 is a schematic front view of a printed pattern detecting apparatus which is a further embodiment of the present invention.

As shown in FIG. 6, the printed pattern detecting apparatus comprises a light source 1, a lens 3, an optical fiber bundle 2, a fiber plate 5, sensors 4a, 4b, and a shielding plate 6. In addition it comprises a beam splitter 8 with a longitudinal axis of the same length as the length of the fiber plate in the scanning direction, a lens 9 arranged such that the focal points thereof are positioned on the surface of the sensor 4b and on the end face of the fiber plate 5, and a dichroic mirror 10 for reflecting light of a wavelength substantially corresponding to that of orange and for transmitting light of other wavelength. The dichroic mirror 10 is also arranged such that another focal point of the lens 9 is positioned on the surface of the sensor 4a. The light source 1 is selected to emit light having red and orange wavelengths.

The light having red and orange wavelengths emitted from the light source 1 enters the beam splitter 8 via the lens 3 and the optical fiber bundle 2 and passes through the fiber plate 5 so that the surface of the bill 7 is irradiated thereby. The light reflected from each of the micro areas on the surface of the bill 7 passes through a corresponding optical fiber 5a of the fiber plate 5, is thereafter, reflected by a 45 degree reflecting mirror of the beam splitter 8. Since the lens 9 is arranged such that the focal points thereof are positioned on the surfaces of the sensors 4a, 4b and on the end face of the fiber plate 5 as described above, the reflected light of orange wavelength is converged onto the surface of the sensor 4a, whereas other reflected light is converged onto the surface of the sensor 4b. Consequently, by scanning the sensor 4a, a first printed pattern based on the reflected orange light from the bill 7 can be obtained, and by scanning the sensor 4b, a second printed pattern based on the reflected red light from the bill 7 can be obtained.

Similarly to the earlier embodiment, the printed patterns transferred onto the image formation surfaces of the sensors 4a, 4b are scanned in the scanning direction perpendicular to the conveying direction A in response to clock signals from the control device (not shown) so as to feed the thus obtained printed pattern data for the entire bill surface to the processing device (not shown), whereby they are compared with the reference pattern to discriminate the genuineness, kind and the like of the bill 7.

Since this embodiment employs a light source 1 which emits the light of both red and orange wavelengths, it is possible to obtain the printed patterns of the bill 7 based on two-color separation and accurately detect the printed pattern of the bill 7 by means of a simpler optical system.

Furthermore, according to this embodiment, since the optical axis of the incident light is substantially coincident with that of the reflected light, the reflection efficiency between the irradiated light and the reflected light can be improved.

Figure 7:
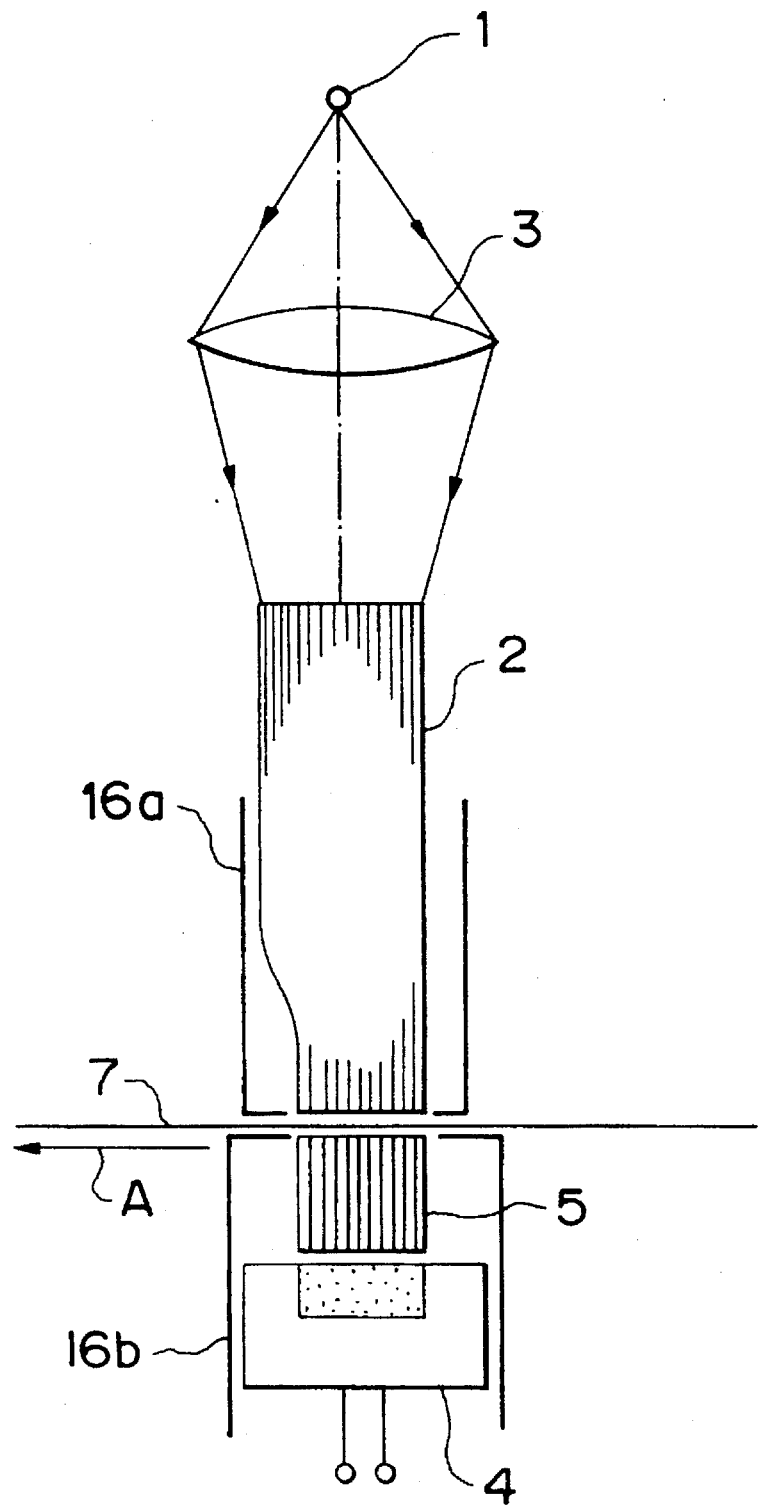
FIG. 7 is a schematic front view of a printed pattern detecting apparatus which is a still further embodiment of the present invention.

FIG. 7 is a schematic front view of a printed pattern detecting apparatus which is a still further embodiment of the present invention.

The printed pattern detecting apparatus of FIG. 7 is adapted to detect the printed pattern of the bill 7 based on light transmitted through the bill 7. Similarly to the embodiment shown in FIGS. 1 to 4, light emitted from the light source 1 is converged onto the end face of the optical fiber bundle 2 by the lens 3 so that the surface of the bill 7 is irradiated therewith through the optical fiber bundle 2. A shielding plate 16a is disposed to allow only light emitted from the light source 1 to reach the surface of the bill 7. On the opposite side of the conveying passage of the bill 7 from the optical fiber bundle 2 are provided a fiber plate 5 for receiving the light transmitted through the bill 7 and a sensor 4 for receiving the transmitted light via the fiber plate 5 so as to enable detection of the printed pattern of the bill 7. A shielding plate 16b is disposed to allow all the light transmitted through the bill 7 to be received by the fiber plate 5.

The fiber plate 5 is positioned to be spaced slightly from the lower surface of the bill 7 conveyed by the conveying apparatus (not shown) such that each of the particular optical fibers 5a receives only light transmitted through a single corresponding bill 7 micro area of predetermined size and is prevented from receiving the light transmitted through any other micro area of the bill 7. Since each of the micro areas on the surface of the bill 7 corresponds to a particular optical fiber 5a of the fiber plate 5, the transmitted light through each of the micro areas can be received by and only by the corresponding optical fiber 5a. The CCD sensor 4 is provided with a number of pixels at the image formation surface thereof. Each of the pixels is adapted to receive the light transmitted through a particular micro area on the surface of the bill 7 via the corresponding optical fiber 5a so that the image formation surface of the sensor 4 receives the transmitted light through the entire bill 7 as an image of the printed pattern.

Similarly to the embodiment shown in FIGS. 1 to 4, the printed-patterns transferred onto the image formation surface of the sensor 4 are scanned in the scanning direction perpendicular to the conveying direction A in response to clock signals from a control device (not shown) so as to feed the printed pattern data for the entire bill surface to a processing device (not shown), whereby it is compared with a reference pattern to discriminate the genuineness, kind and the like of the bill 7.

According to this embodiment, since the light transmitted through each of the micro areas on the surface of the bill 7 is received by the corresponding pixel on the image formation surface of the sensor 4 via the corresponding optical fiber 5a of the fiber plate 5, whereby, the pixel stores only the printed pattern data for the corresponding micro area of the bill 7, it is possible to accurately detect the printed pattern of the bill 7 without influence from stray light.

As described above with reference to the preferred embodiments, according to the present invention, it is possible to provide a pattern detecting apparatus for accurately detecting fine patterns on an object whose pattern is to be detected, such as a bill, coin or the like.

The present invention has thus been shown and described with reference to the specific embodiments. However, it should be noted that the present invention in no way limited to the details of the described arrangements but changes and modifications may be made without departing from the scope of the appended claims.

For example, although the above described embodiments detect the pattern printed on a bill 7, the present invention is not limited to detection of the printed pattern on a bill but can be used for detecting printed patterns including characters, numerals, symbols, figures and the like printed on various other kinds of sheet materials. Further, in the embodiments shown in the FIGS. 1 to 6, it is possible to detect patterns formed on the surface of a coin or the like by means of a method other than printing.

Further, although in the above described embodiments the fiber plate 5 allows only light from a bill or other such object oriented in a predetermined direction to pass therethrough, in place of the fiber plate 5 it is possible to employ some other member with optical characteristics such that light from a particular micro area on the surface of the object can be received by and only by the end face thereof facing the object and be fed out from the other end face thereof, when it is positioned adjacent to the object. For example, a large number of hollow pipes each having a minute cross section and having a cylindrical or honeycomb shape may be employed.

Furthermore, although in the above described embodiments the sensor 4 is provided with a number of pixels arranged in a plurality of lines along the scanning direction, it is possible to arrange the pixels of the sensor in a single line.

Moreover, although in the embodiment shown in FIG. 5 the printed pattern information based on two-color separation is obtained by employing two light sources 1a, 1b one emitting green light and the other emitting red light, it is apparent that the printed pattern information based on the separation of more than two colors may be obtained by further providing light sources emitting light of other wavelengths in addition to the above described light sources. Further, in the embodiment shown in FIG. 6, printed pattern information based on the separation of more than two colors may be obtained by providing additional dichroic mirrors and sensors.

Further, in the embodiment shown in FIG. 5, it is possible to arrange the apparatus so that both of the light sources 1a, 1b emit white light simultaneously, that the light from both of the light sources 1a, 1b is reflected by the bill 7 and that the printed pattern transferred onto the sensor 4 is scanned. According to this alternative arrangement, since the white light can be simultaneously emitted from both of the end faces of the optical fiber bundle 2a, 2b onto the bill 7, it is possible to accurately detect the printed pattern, even though the reflectivity of the bill 7 is small.

Furthermore, although in the above described embodiments the bill is irradiated by the light sources, the lenses, and the optical fiber bundles, it is apparent that laser sources which emit laser beam may be used instead thereof.

Moreover, in the present invention, the respective means need not necessarily be physical means and arrangements whereby the function of the respective means are accomplished by software fall within the scope of the present invention. In addition, the function of a single means may be accomplished by two or more physical means and the functions of two or more means may be accomplished by a single physical means.

We claim:

1. A pattern detecting apparatus for detecting a pattern of an object comprising:

at least one light source;

an optical fiber bundle comprising a plurality of first optical fibers for guiding light from said light source, said first optical fibers being arranged to provide light onto a plurality of micro areas on a surface of said object;

light detecting means including a plurality of pixels for detecting light reflected from said surface of said object, said pattern on said surface of said object being detected based on information from said light detecting means;

light transmitting means comprising a plurality of second optical fibers for transmitting light advancing in a first predetermined direction, said light transmitting means being positioned between said object and said optical fiber bundle such that said predetermined first direction coincides with a second direction in which light reflected from said object advances, said plurality of second optical fibers being arranged to receive said light reflected from said plurality of micro areas on said surface of said object;

a first beam splitter positioned between said optical fiber bundle and said light transmitting means for transmitting light from said optical fiber bundle and reflecting said light reflected from said surface of said object and transmitted through said light transmitting means so that said light detecting means can receive said light reflected by said first beam splitter; and a second beam splitter for reflecting said light reflected from said first beam splitter so that said light detecting means can receive said light reflected by said second beam splitter;

said plurality of pixels of said light detecting means receiving light from said plurality of second optical fibers via said first beam splitter; and said plurality of pixels receiving substantially only information representative of said plurality of micro areas on said surface of said object.

2. A pattern detecting apparatus for detecting a pattern of an object in accordance with claim 1, wherein:

said at least one light source comprises a plurality of light sources emitting at least two kinds of light of different wavelengths; and said light detecting means alternately detects said light reflected from said object of each of said at least two kinds of light of different wavelengths by time sharing.

3. A pattern detecting apparatus for detecting a pattern of an object in accordance with claim 2, further comprising:

optical means for converging light from said at least one light source into said optical fiber bundle.

4. A pattern detecting apparatus for detecting a pattern of an object in accordance with claim 2, further comprising:

a dichroic mirror reflecting light of a predetermined first wavelength and transmitting light of wavelengths other than said first wavelength;

wherein said at least one light source comprises:

a first light source emitting light of a first wavelength, and a second light source emitting light of a second wavelength different than said first wavelength; and said light detecting means includes first light detecting means having a first plurality of pixels, and second detecting means having a second plurality of pixels, said first detecting means receiving light of said first wavelength reflected from said dichroic mirror, and said second detecting means receiving light of wavelengths other than said first wavelength transmitted through said dichroic mirror.

5. A pattern detecting apparatus for detecting a pattern of an object in accordance with claim 1, further comprising:

optical means for converging light from said at least one light source into said optical fiber bundle.

6. A pattern detecting apparatus for detecting a pattern of an object comprising:

at least one light source;

an optical fiber bundle comprising a plurality of first optical fibers for guiding light from said light source, each of said plurality of first optical fibers being arranged to provide light onto a respective plurality of areas on a surface of said object;

light detecting means including a plurality of pixels for detecting light transmitted through said object, said pattern on said surface of said object being detected based on information from said light detecting means; and light transmitting means comprising a plurality of second optical fibers for transmitting light, said light transmitting means being positioned between said object and said light detecting means, each of said plurality of second optical fibers being arranged to receive said light transmitted through a respective one of a plurality of micro areas on said surface of said object;

each of said plurality of pixels of said light detecting means receiving light from a respective one of said plurality of second optical fibers; and each of said plurality of pixels receiving substantially only information representative of said respective one of said plurality of micro areas on said surface of said object.

7. A pattern detecting apparatus for detecting a pattern of an object in accordance with claim 6, wherein:

said at least one light source comprises a plurality of light sources emitting at least two kinds of light of different wavelengths; and said light detecting means alternately detects said light reflected from said object of each of said at least two kinds of light of different wavelengths by time sharing.

8. A pattern detecting apparatus for detecting a pattern of an object in accordance with claim 7, further comprising:

optical means for converging light from said at least one light source into said optical fiber bundle.

9. A pattern detecting apparatus for detecting a pattern of an object in accordance with claim 8, wherein:

said plurality of pixels of said light detecting means are arranged in a line lying perpendicular to a direction in which said object is fed.

10. A pattern detecting apparatus for detecting a pattern of an object in accordance with claim 7, wherein:

said plurality of pixels of said light detecting means are arranged in a line lying perpendicular to a direction in which said object is fed.

11. A pattern detecting apparatus for detecting a pattern of an object in accordance with claim 6, further comprising:

optical means for converging light from said at least one light source into said optical fiber bundle.

12. A pattern detecting apparatus for detecting a pattern of an object in accordance with claim 11, wherein:

said plurality of pixels of said light detecting means are arranged in a line lying perpendicular to a direction in which said object is fed.

13. A pattern detecting apparatus for detecting a pattern of an object in accordance with claim 6, wherein:

said plurality of pixels of said light detecting means are arranged in a line lying perpendicular to a direction in which said object is fed.

* * * * *